(12) United States Patent
Del-Aguila et al.

(10) Patent No.: US 10,051,160 B2
(45) Date of Patent: Aug. 14, 2018

(54) SCROLLING SYSTEM FOR A ROLL OF PRINTED MEDIA AND A METHOD THEREFOR

(71) Applicant: OCÉ-TECHNOLOGIES B.V., Venlo (NL)

(72) Inventors: Arlette Del-Aguila, Venlo (NL); Michael Dupre, Venlo (NL)

(73) Assignee: OCÉ-TECHNOLOGIES B.V., Venlo (NL)

( * ) Notice: Subject to any disclaimer, the term of this patent is extended or adjusted under 35 U.S.C. 154(b) by 143 days.

(21) Appl. No.: 15/145,014

(22) Filed: May 3, 2016

(65) Prior Publication Data
US 2016/0248945 A1  Aug. 25, 2016

Related U.S. Application Data

(63) Continuation of application No. PCT/EP2014/073543, filed on Nov. 3, 2014.

(30) Foreign Application Priority Data

Nov. 4, 2013 (EP) .................................... 13306510

(51) Int. Cl.
*G09F 11/00* (2006.01)
*H04N 5/225* (2006.01)
(Continued)

(52) U.S. Cl.
CPC ............. *H04N 5/225* (2013.01); *G09F 11/29* (2013.01); *G09F 11/295* (2013.01);
(Continued)

(58) Field of Classification Search
CPC ........ G09F 11/23; G09F 11/025; G09F 11/00; G09F 11/12; G09F 11/29
See application file for complete search history.

(56) References Cited

U.S. PATENT DOCUMENTS 5,442,859 A * 8/1995 Naumann .............. G06K 15/22
33/1 M
6,000,946 A * 12/1999 Snyders .................. G09F 11/29
434/107

(Continued)

*Primary Examiner* — Cassandra Davis
(74) *Attorney, Agent, or Firm* — Birch, Stewart, Kolasch & Birch, LLP

(57) ABSTRACT

A scrolling system for scrolling a printed roll of media includes a mechanical scrolling apparatus and a user interface device. The mechanical scrolling apparatus includes a first winder for placing the printed roll and from which first winder the printed roll is unwindable, and a second winder for winding up the printed roll unwound from the first winder. At least one winder of the first and second winder is drivable by a motor. An unwound area is a piece of the printed roll that is unwound from the first winder and not yet wound up on the second winder. The user interface device is configured to receive a selection of a part of a digital representation of images printed on the roll. Upon receiving a selection of the part of the digital representation of the images printed on the roll by means of the user interface device, the motor is activated in order to scroll the printed roll by means of the two winders until a piece of the printed roll arrives in the unwound area, which piece of the printed roll corresponds to the selected part of the digital representation. A method to be applied by the scrolling system is also disclosed.

11 Claims, 12 Drawing Sheets

(51) Int. Cl.
  *G09F 11/29*    (2006.01)
  *G09F 11/295*   (2006.01)
  *G09F 11/32*    (2006.01)
  *H04N 1/00*     (2006.01)

(52) U.S. Cl.
  CPC ......... *G09F 11/325* (2013.01); *H04N 1/0032* (2013.01); *H04N 1/00246* (2013.01); *G09F 2011/0018* (2013.01)

(56) References Cited

U.S. PATENT DOCUMENTS

| | | | | |
|---|---|---|---|---|
| 6,252,575 | B1* | 6/2001 | Kern | G09F 11/29 340/815.83 |
| 6,572,011 | B1* | 6/2003 | Allman | G09F 11/29 235/375 |
| 2002/0030662 | A1* | 3/2002 | Mari | G09F 11/21 345/156 |

* cited by examiner

SCROLLING SYSTEM FOR A ROLL OF PRINTED MEDIA AND A METHOD THEREFOR

CROSS-REFERENCE TO RELATED APPLICATIONS

This application is a Continuation of International Application No. PCT/EP2014/073543, filed on Nov. 3, 2014, and for which priority is claimed under 35 U.S.C. § 120. PCT/EP2014/073543 claims priority under 35 U.S.C. § 119(a) to Application No. 13306510.2, filed in Europe on Nov. 4, 2013. The entire contents of each of the above-identified applications are hereby incorporated by reference into the present application.

BACKGROUND OF THE PRESENT INVENTION

1. Field of the Invention

The present invention relates to a scrolling system for scrolling a printed roll of media comprising a mechanical scrolling apparatus and a user interface device. The mechanical scrolling apparatus comprises a first winder for placing the printed roll and from which first winder the printed roll is unwindable, and a second winder for winding up the printed roll unwound from the first winder. At least one winder of the first and second winders is drivable by a motor. An unwound area at which is a piece of the printed roll that is unwound from the first winder and not yet wound up on the second winder.

2. Description of Background Art

Nowadays, printing systems are available for printing images on a roll of media. When the roll of media is printed completely with images, it is difficult to find a specific image printed on the roll. Mechanical solutions are provided such that a user interaction is limited to a start and a stop of the unwinding of the roll.

SUMMARY OF THE INVENTION

It is an objective of the present invention to provide a system for facilitating an easier way of looking for an image printed on a roll of media.

According to the present invention, this object is achieved by a scrolling system, wherein the user interface device is configured to receive a selection of a part of a digital representation of images printed on the roll. Upon receiving a selection of the part of the digital representation of the images printed on the roll by means of the user interface device, the motor is activated in order to scroll the printed roll by means of the first and second winders until a piece of the printed roll arrives in the unwound area, which piece of the printed roll corresponds to the selected part of the digital representation.

An operator selects the image he needs on the digital representation of the images of the printed roll by means of the user interface device. The printed roll will be automatically unwound to the correct position on the printed roll. According to an embodiment, the mechanical scrolling apparatus measures which part of the printed roll arrives in the unwound area by a sensor or a camera positioned near the media unwound from the roll. According to another embodiment, the mechanical scrolling apparatus registers the amount of media already unwound from the first winder and/or the amount of media already wound up on the second winder. By doing so, the part of the printed roll in the unwound area is exactly known.

According to an embodiment, the user interface device is configured to display at least a part of the digital representation of images printed on the roll in order to facilitate the selection of the part of the digital representation. The operator or user may select on a display of the user interface device a part of the digital representation. For example, a particular image may be selected or a plurality of images may be selected. The plurality of images may have been consecutively printed on the roll.

According to an embodiment, the user interface device is configured to receive a scrolling action for scrolling to a part of the digital representation, and scrolling to the part of the digital representation on the user interface device invokes an activation of the motor in order to scroll the printed roll by means of the two winders until a piece of the printed roll arrives in the unwound area, which piece of the printed roll corresponds to the part of the digital representation scrolled to. Scrolling may be enabled by means of a touch screen of the user interface device or by means of a display of the user interface device, which display shows scrolling bars along the part of the digital representation of the images printed on the roll. Forward and backward scrolling is enabled and forward and backward winding of the first and second winders is enabled, respectively. In case of forward and backward winding the printed roll, two motors, one motor coupled to a holder of the first winder and one motor coupled to a holder of the second winder, may be envisioned. In this way, the scrolling mechanical apparatus may be designed rather symmetrically with respect to the first winder and the second winder.

According to an embodiment, the scrolling system comprises a camera system for determination of a moment of arrival of the piece of the printed roll in the unwound area. The camera system registers the printed images on the roll and compares the printed images with the digital images on the digital representation. By doing so, synchronization of the scrolling of the digital representation and the winding of the winders is established.

According to an embodiment, the unwound area comprises a view area for viewing the piece of the printed roll, which piece of the printed roll corresponds to the selected part of the digital representation. By doing so, the user or operator is able to check the piece of the printed roll that arrives in the unwound area.

According to an embodiment, the scrolling system comprises a finishing system positioned near or in the unwound area for finishing a piece of the printed roll, which piece of the printed roll corresponds to a part of the digital representation, which part of the printed roll is selected on the user interface device. Such a finishing system may be a cutting system, a grommet machine, a puncher, a stapler, etc. The finishing of a particular piece of the printed roll may be indicated in a corresponding part of the digital representation by means of finishing marks alongside of or within the corresponding part of the digital representation. A finishing mark on the digital representation may determine an activation of the finishing system when a location on the piece of the printed roll corresponding to the finishing mark on the representation of the printed roll arrives at the finishing system in the unwound area.

According to a further embodiment, the finishing system is a cutting system for cutting the printed roll into at least two portions, and wherein upon cutting the printed roll into the at least two portions, the digital representation of the images on the printed roll will be split into a first digital representation corresponding to printed images on media left on the first winder and a second digital representation corresponding to printed images on media left on the second winder.

According to an embodiment, the scrolling system comprises a roll-to-roll printing system. The roll of media is printed upon in the unwound area. When the roll is completely printed upon with images, the first and second winder may be activated to unwind the printed images from the second roll, again by means of user interface device. The unwound area may be enlarged to allow printing on the unwound media in the unwound area and/or viewing in the unwound area of the images printed on the media and/or finishing of media in the unwound area.

The present invention also relates to a method for winding a printed roll, the method comprising the steps of: displaying, by means of a user interface device, at least a part of a digital representation of images printed on a roll; receiving a selection of a part of the digital representation by means of the user interface device; and automatically winding the printed roll to a piece of the printed roll, which piece of the printed roll corresponds to the selected part of the digital representation.

According to an embodiment of the method, the part of the digital representation is selected by scrolling to a position of the digital representation on the user interface device.

According to an embodiment of the method, the printed roll is wound until the piece of the printed roll is visible for operator inspection.

According to an embodiment, the method comprises the further steps of: receiving a command at the user interface means for finishing the piece of the roll with a finisher; and finishing the piece of the printed roll.

The present invention also relates to a non-transitory recording medium comprising computer executable program code configured to instruct a computer to perform the method according to any of the previous method embodiments.

It may be clear for the skilled person that the previous embodiments of the scrolling system may be combined in one way or another resulting in embodiments, which also fall under the scope of the invention. It may be clear for the skilled person that the previous embodiments of the methods may be combined in one way or another resulting in embodiments, which also fall under the scope of the invention.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMEMTS

Figure 1:
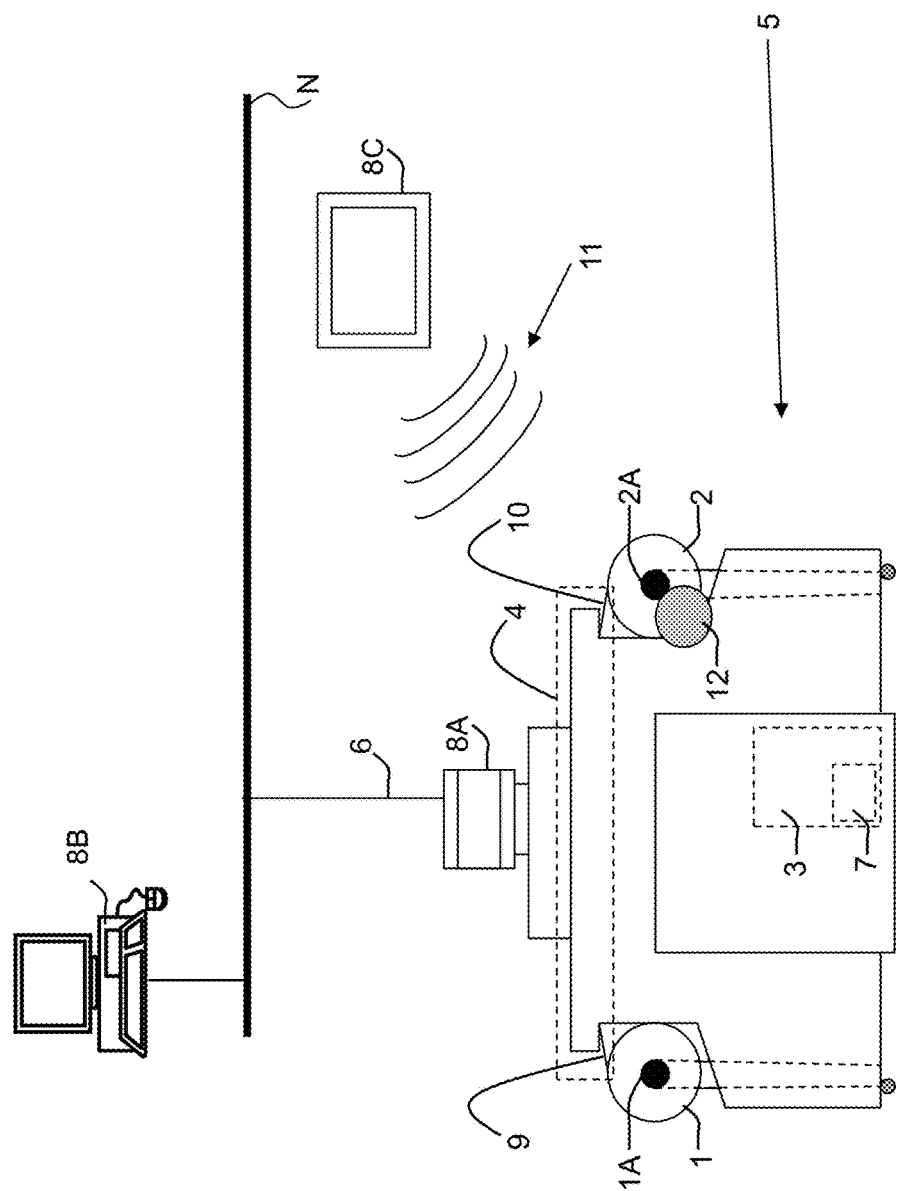
FIG. 1 schematically shows a scrolling system according to the present invention.

The present invention will now be described with reference to the accompanying drawings, wherein the same reference numerals have been used to identify the same or similar elements throughout the several views.

FIG. 1 shows a scrolling system comprising a mechanical scrolling apparatus 5 and at least one of a first user interface device 8A, a second user interface device 8B and a third user interface device 8C. The first user interface device 8A represents a local user interface attached to the mechanical scrolling apparatus 5. The first user interface device 8A may be optional to the mechanical scrolling apparatus 5. The second user interface device 8B represents a workstation 8B, which is connected to a network N. The third user interface device 8C represents a mobile user interface device, which has a wireless connection 11 with the mechanical scrolling apparatus 5.

The mechanical scrolling apparatus 5 is available for an operator or user working with one of the user interface devices 8A-8C and intending to find an image printed on a roll 1 wound on a first winder 1A. The mechanical scrolling apparatus 5 is connected to the network N via a wired or wireless connection 6 and is suited for receiving activation calls from at least one of the user interface devices 8A-8C. The network N may be wireless. The mechanical scrolling apparatus 5 comprises a local user interface unit 8A suitable for displaying print jobs, selecting a print job, editing settings of a print job and constructing and displaying the digital representation comprising digital images of the images printed on the roll according to the present invention. The digital representation may also be constructed or displayed on at least one of the workstation 8A-8B and/or at the mobile device 8C wired or wirelessly connected to the printing system. The digital representation may be built at print time, for example by a printing system on which the digital images are printed. In another embodiment, a user interface is provided as a network site that is accessible with a browser on a client computer. The user interface device 8A-8C is connected to a control unit 3 of the mechanical scrolling apparatus 5.

The control unit 3 is suited to activate and deactivate the first winder 1A and the second winder 2A in order to unwind the printed roll 1 from the first winder 1A and to wind up the printed roll 1 on the second winder 2A. Digital images representing the images printed on the roll 1 may be stored in a storage 7 contained in the control unit 3 or may be stored elsewhere and being available via the network N. The digital images may, for example be stored in the workstation 8B. The digital images may also be stored in the mobile user interface device 8C. The mechanical scrolling apparatus 5 works up the roll 1 of wound printed media having a length, which is defined as a largest dimension of the media when unrolled. Media material may be paper, textile, overhead sheet material, plastic or any other kind of material or substrate suitable for winding up on a roll. The printed roll 1 has been put on the winder 1A. Individual digital images have been printed on the roll 1. The printed media 9 on the roll 1 is entering the mechanical scrolling apparatus 5 on the left side, is transferred through an unwound area 4, and leaving the mechanical scrolling apparatus 5 on the right side. The printed media 10 leaving the scrolling apparatus 5 is wound up upon a second winder 2A—similar to the first winder 1A. Media 2 has been unwound from the first winder 1A and has been wound up on the second winder 2A. The unwound area 4 is the area at which a piece of the printed roll 1 is unwound from the first winder 1A and not yet wound up on the second winder 2A.

At least one winder of the first winder 1A and the second winder 2A is drivable by a motor 12. The motor is, for example a step motor whose normal shaft motion consists of discrete angular movements of essentially uniform magnitude when driven from sequentially switched direct current power supply. The velocity of the media through the unwound area is recordable and/or derivable at each moment and can be used to determine the amount of winding before the selected part of the digital representation arrives in the unwound area 4.

According to an embodiment, synchronization of the scrolling of digital images of the digital representation and the winding of the two winders is established by a gauge at the beginning of the printed roll 1 and at the end of the printed roll 1. The gauge is compared to an indication mark at the beginning of the roll and the end of the roll, visualized in the digital representation (See FIGS. 8, 9A, 9B). A thickness of the medium and a diameter of the winders 1A, 2A of the printed roll 1 may be set in an initialization step for calculations regarding the amount of winding to a position determined by scrolling through the digital images of the digital representation.

According to another embodiment, the synchronization is established by a camera system (not shown) being part of the scrolling system. The camera system is connected to the control unit 3 of the scrolling system. The camera system determines a moment of arrival of a piece of the printed roll in the unwound area 4, which piece corresponds to a selected part of the digital representation.

The user interface device 8A-8C is configured to receive a selection of a part of a digital representation of images printed on the roll. Such a digital representation may be stored on at least one of the user interface devices 8A-8C or in the storage 7 in the mechanical scrolling apparatus 5 or on any other storage location which is accessible by means of the network N.

A user may start a software application on one of the user interface devices 8A-8C in order to display the digital representation of the images printed on the roll 1. When the user selects a part of the digital representation of the images printed on the roll 1 by means of the user interface device 8A-8C the motor 12 is activated in order to scroll the printed roll by means of the two winders 1A, 2A until a piece of the printed roll 1 arrives in the unwound area 4, which piece of the printed roll 1 corresponds to the selected part of the digital representation. The digital representation of the images printed on the roll 1 comprises, for each image printed on the roll 1, digital information at which position on the roll 1 the image is printed.

Figure 2A:
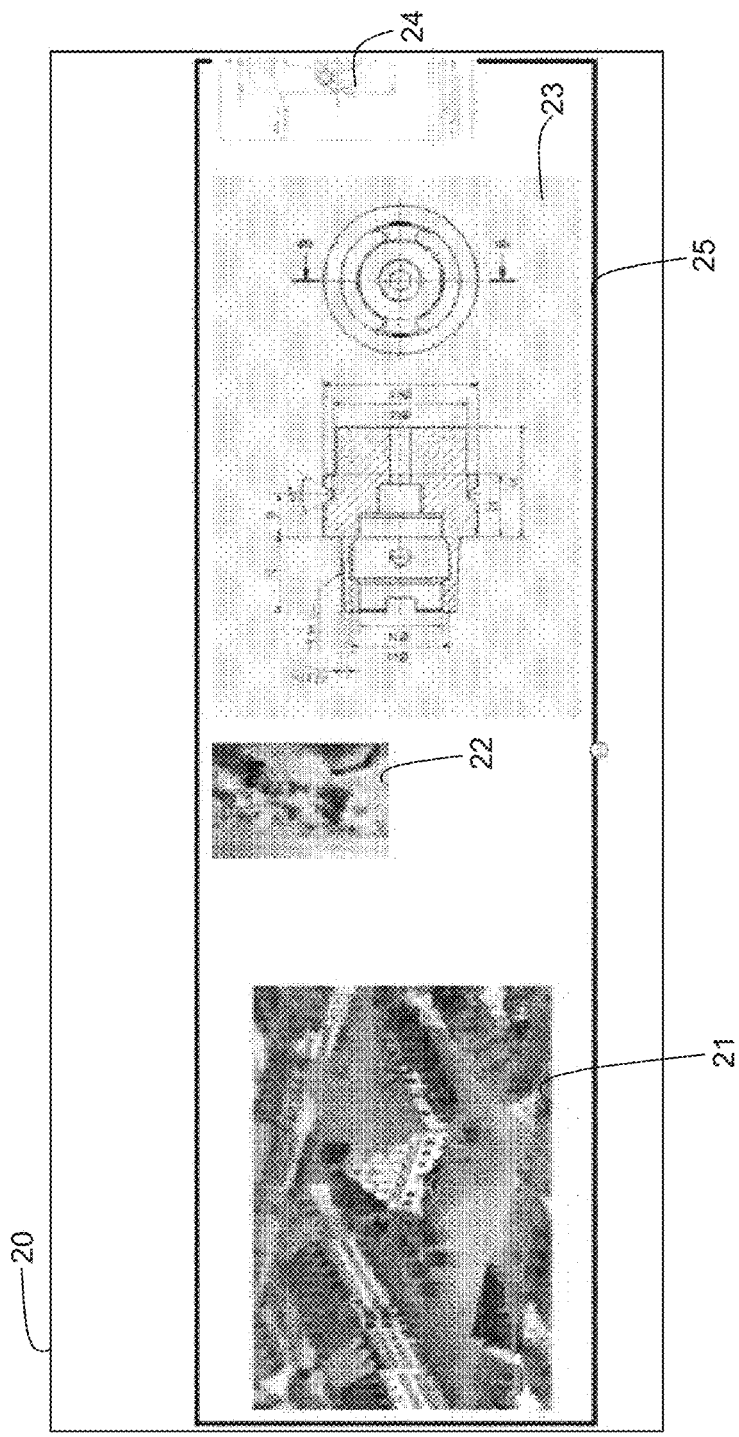
FIGS. 2A-2B and FIGS. 3A-3B schematically show user interface devices for displaying a part of a digital representation of images printed on the roll.

FIG. 2A shows the user interface device 20 according to the invention. The user interface device 20 displays a part 25 of a digital representation of images 21, 22, 23, 24 printed on the roll. The operator or user may select on the user interface device 20 a part of the digital representation 25.

For example, a particular image of the images 21, 22, 23, 24 may be selected or a plurality of images may be selected. The plurality of images may have been consecutively printed on the roll, but may also be dispersed among the images of the digital representation 25. According to an embodiment shown in FIG. 2A the digital representation 25 comprises individual digital images 21, 22, 23, 24 in a sequence in which the individual digital images 21, 22, 23, 24 have been printed on the roll. Depending on the dimensions of a display of the user interface device 20, the dimensions of the individual digital images 21, 22, 23, 24, and on the scaling factor applied to the digital representation 25, the number of displayed individual digital images may vary.

Figure 2B:
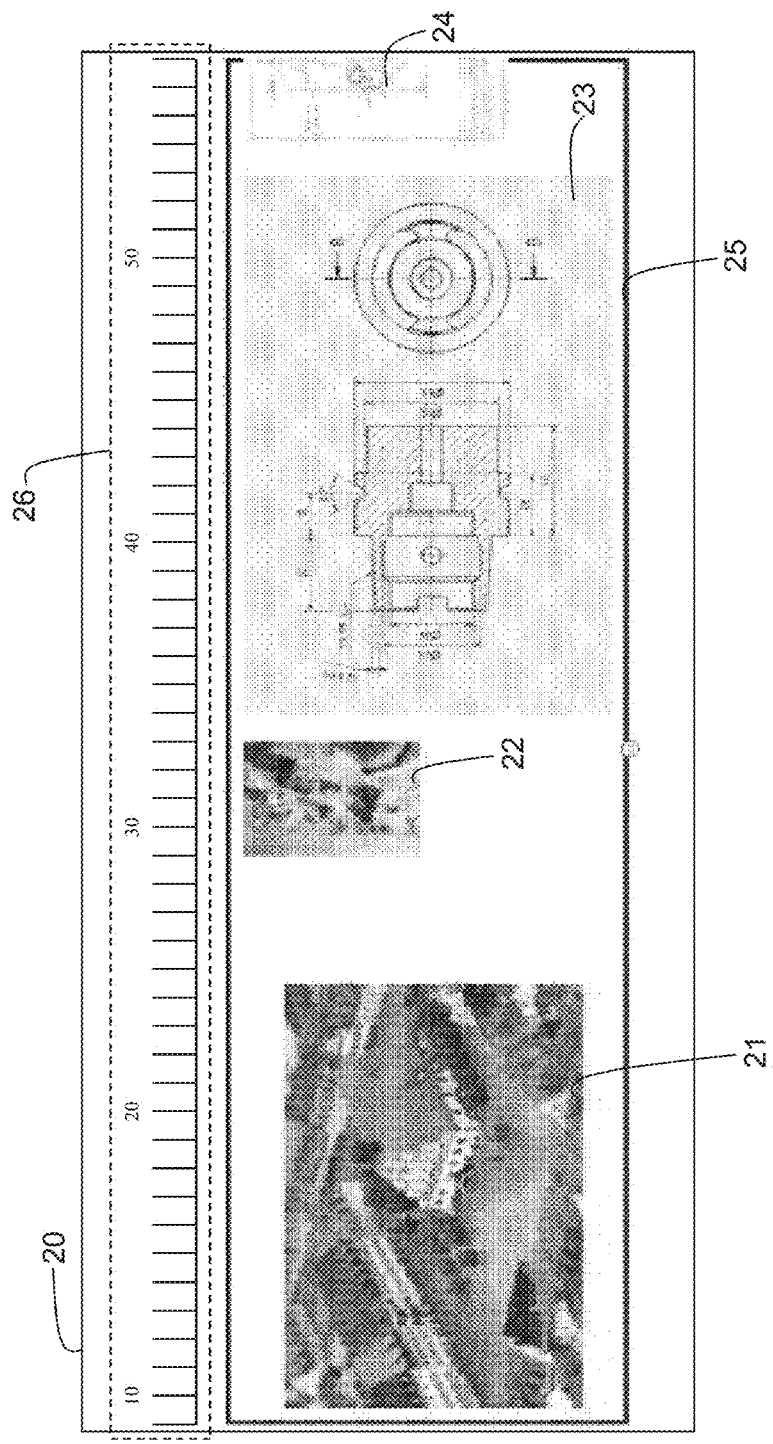

FIG. 2B shows another embodiment of the digital representation 25 on the user interface device 20. A distance indicator 26 is provided along the individual digital images 21, 22, 23, 24. The distance indicator 26 indicates at which distance from the beginning of the roll each individual digital image has been printed. The distance indicator is provided with a ruler with tick marks and numeric indications in a distance unit of measurement, like inches, feet, yards, decimeters, centimeters, meters, etc.

Figure 3B:
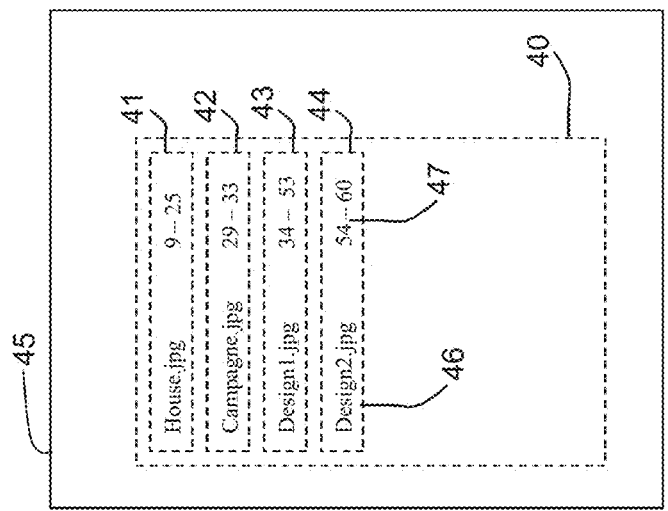
Figure 3A:
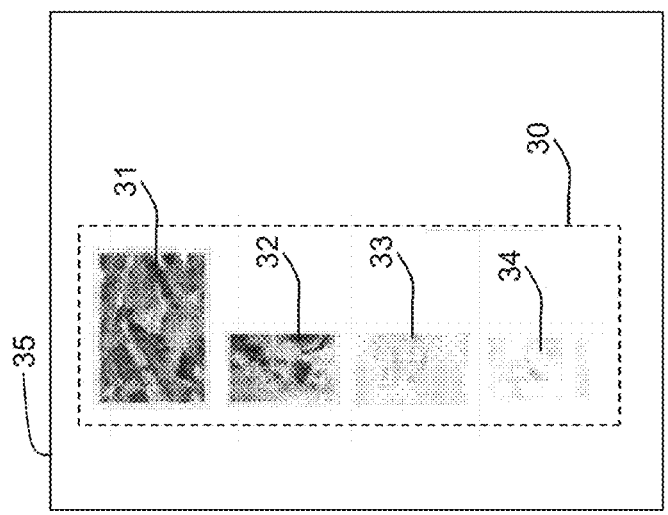

FIG. 3A shows another embodiment of a digital representation 35 according to the invention. The digital representation 35 comprises a list 30 of selectable thumbnails 31-34. Each thumbnail 31-34 corresponds to an image printed on the roll. With each thumbnail 31-34, a position of the corresponding image on the roll is stored. The list 30 of thumbnails 31-34 may be sorted in a same order as the order in time of the printing of the corresponding images on the roll.

FIG. 3B shows another embodiment of a digital representation 45 according to the invention. The digital representation 45 comprises a list 40 of selectable items 41-44. Each item 41-44 corresponds to an image printed on the roll. For each item 41-44 in the list 40 a file name 46 and a length item 47 of a start position of the corresponding image on the roll and an end position of the corresponding image on the roll are shown. The list 40 of items may be sorted in a same order as the order in time of the printing of the corresponding images on the roll. Besides the file name 46 and the length item 47, other metadata of the printed image may be shown in the list 40, for example, creation time of the digital image, print time of the printed image, etc.

The embodiments shown in FIGS. 2A, 2B, 3A, 3B may be combined in one way or another by the person skilled in the art for establishing embodiments falling under the scope of the present invention.

According to an embodiment, the digital representations 25 (FIGS. 2A-2B), 35 (FIG. 3A), and 45 (FIG. 3B) comprise a scroll bar for scrolling backward and forward through the individual digital images in the digital representations 25, 35, 45.

If the user interface device comprises a touch screen, forward and backward scrolling may be achieved by applying swiping gestures to the digital representations 25, 35, 45 in corresponding directions.

Scrolling to a part of the digital representation on the user interface device 20 invokes an activation of the motor of the mechanical scrolling apparatus in order to wind the printed roll by means of the two winders until a piece of the printed roll arrives in the unwound area, which piece of the printed roll corresponds to the part of the digital representation scrolled to on the user interface device 20. Since forward and backward scrolling of the digital representation is enabled, forward and backward winding of the first and second roll is enabled, respectively. In case of forward and backward winding the printed roll, two motors, one motor for the first winder and one motor for the second winder, may be envisioned. In this way, the scrolling mechanical apparatus may be designed rather symmetrically with respect to the first and second winder.

Figure 4:
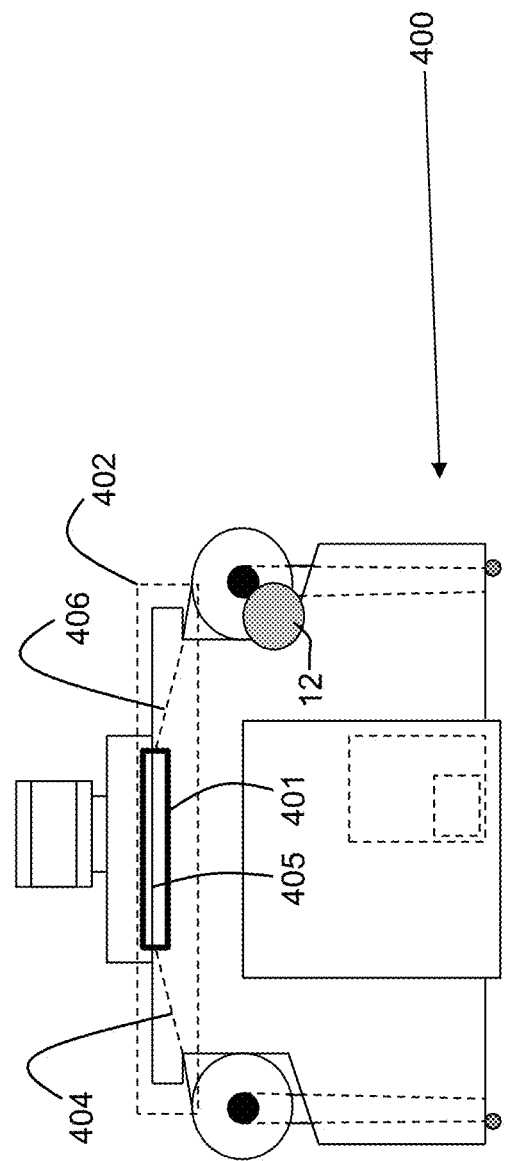
FIG. 4 schematically shows a scrolling system comprising a viewing area.

FIG. 4 shows an embodiment of a mechanical scrolling apparatus 400 according to the invention, wherein the unwound area 402 comprises a view area 401 for viewing a view piece 405 of the printed roll, which view piece 405 corresponds to a selected part of the digital representation on the user interface device. By doing so, the user or operator is able to check if the view piece 405 of the printed roll has arrived in the unwound area 402. The view piece 405 is visible in the view area 401, which is an opening in the mechanical scrolling apparatus 400. The view piece 405 of the printed roll is between a first piece 404 of the roll and a second piece 406 of the roll. Both the first piece 404 and the second piece 406 are invisible for the operator. The view area for viewing the view piece 405 may also be realized as an opening on top of the mechanical scrolling apparatus 400.

Figure 5:
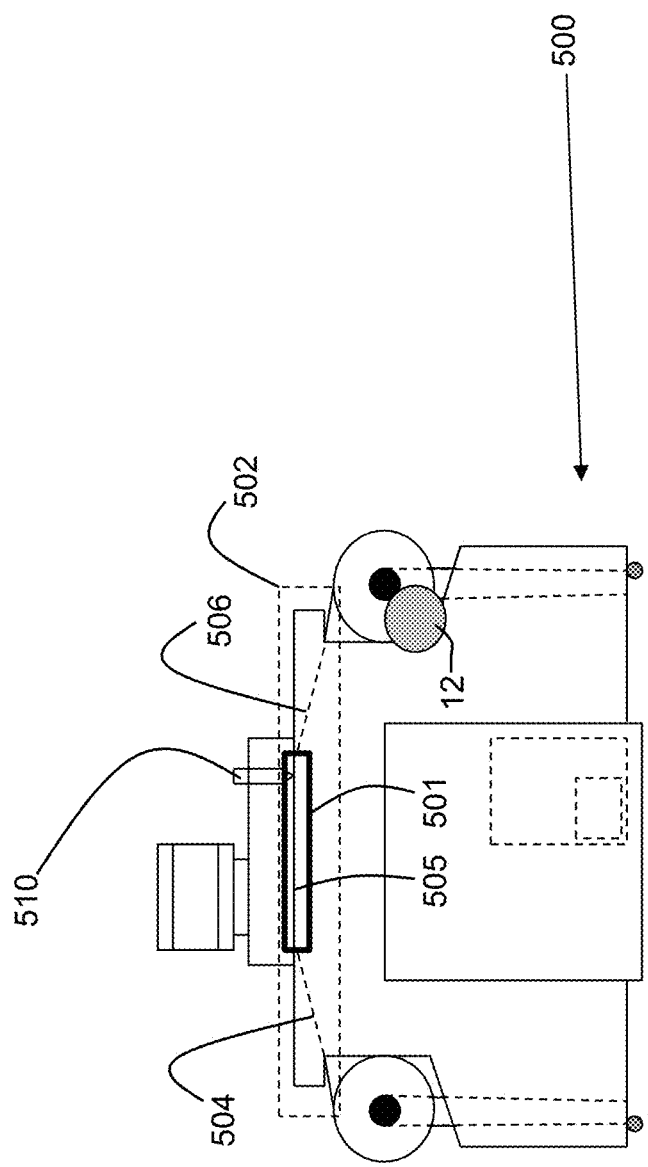
FIG. 5 schematically shows a scrolling system comprising a finishing system.

FIG. 5 shows an embodiment of a mechanical scrolling apparatus 500 according to the invention, wherein the scrolling system comprises a finishing system 510 positioned near or in the unwound area 502 for finishing a piece 505 of the printed roll, which piece 505 corresponds to a part of the digital representation, which part is selected on the user interface device. FIG. 5 shows a cutting system 510 for cutting the roll in the width direction of the roll, being the direction out of the plane of FIG. 5, in two portions. One portion is on the left side of the cutting system 510 and the other portion is on the right side of the cutting system 510. Other finishing devices such as a grommet machine, a puncher, a stapler, etc. may be envisioned.

Figure 6:
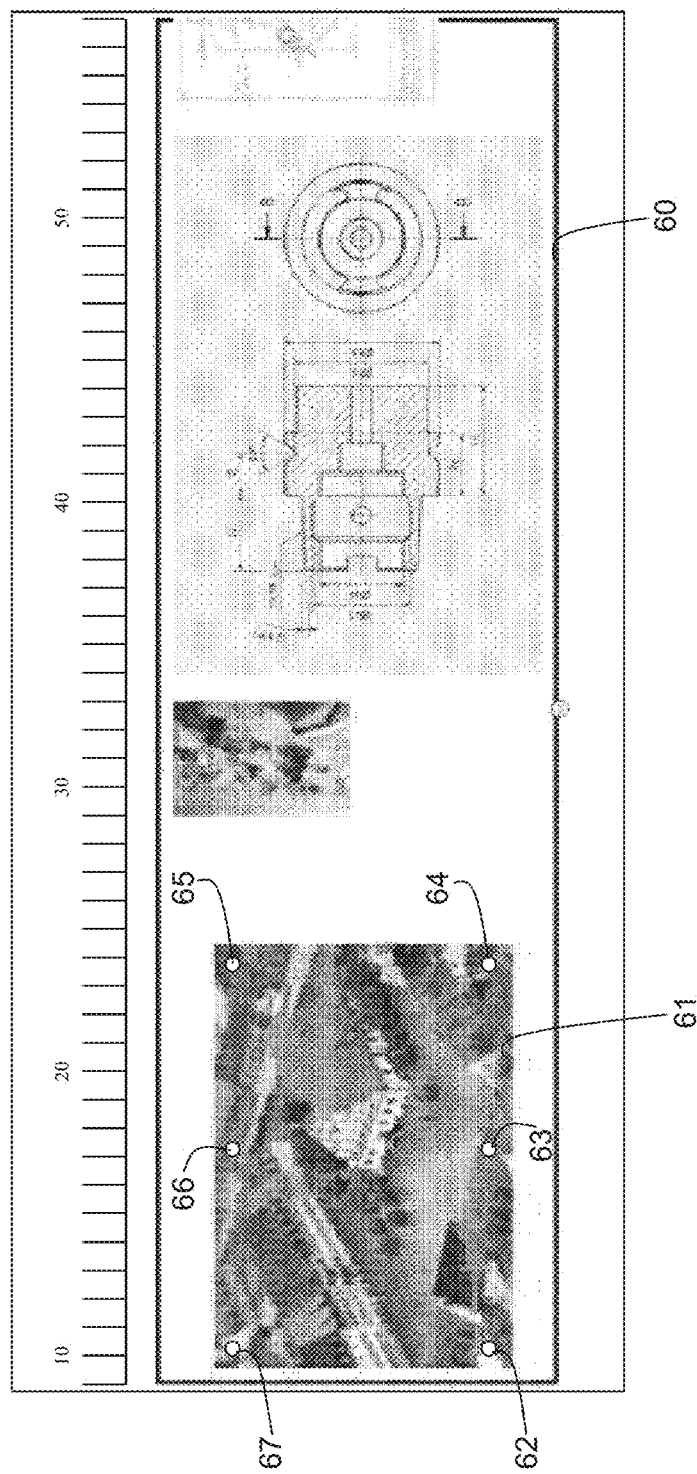
FIGS. 6-7 schematically show digital representations, which comprise finishing marks.

FIG. 6 shows another embodiment of the digital representation 60 of a part of the printed roll. This embodiment is in particular useful when the mechanical scrolling system according to the invention comprises a finishing system, for example, as shown in FIG. 5. The finishing of a particular piece of the printed roll is indicated in a corresponding image 61 of the digital representation 60 by means of finishing marks 62-67 alongside of or within the corresponding image 61 of the digital representation 60. A finishing mark 62-67 on the digital representation determines an activation of the finishing system when a location on the piece of the printed roll corresponding to the finishing mark 62-67 on the digital representation 60 of the printed roll arrives at the finishing system in the unwound area of the mechanical scrolling apparatus. The finishing marks 62-67 indicate holes to be made in the media for grommets, but another way of finishing with an appropriate finishing system may be envisioned. The holes may be stored with the digital image 61 by means of an (x, y)-pair of ordinates.

A software application may enable the selection of a type of finishing mark belonging to a specific finishing operation in order to select images printed on the roll which have the finishing marks indicated by the (x, y)-pair of ordinates.

In a standard graphic arts workflow, finishing marks are added to the digital images to be printed on the roll during a production preparation step before printing or during a finishing preparation step after printing. A software application may be installed at the user interface device or at the controller of the mechanical scrolling apparatus for recognizing the finishing marks on the digital representation. The shape and the color of the finishing marks 62-67 are round and white, respectively, but in order to easily distinguish and recognize a finishing mark from an individual digital image on the digital representation of the roll, another shape and/or another color are envisioned. The software application may enable scrolling through the images of the digital representation to a next finishing mark. The software application may also enable the selection of a specific finishing mark on the user interface device, to which specific finishing mark will be scrolled to in the digital representation. Substantially simultaneously with the selection, the roll of media will wind to the correct position for the finishing operations indicated by the selected type of finishing mark by means of the at least one motor driving the first winder and/or the second winder.

Figure 7:
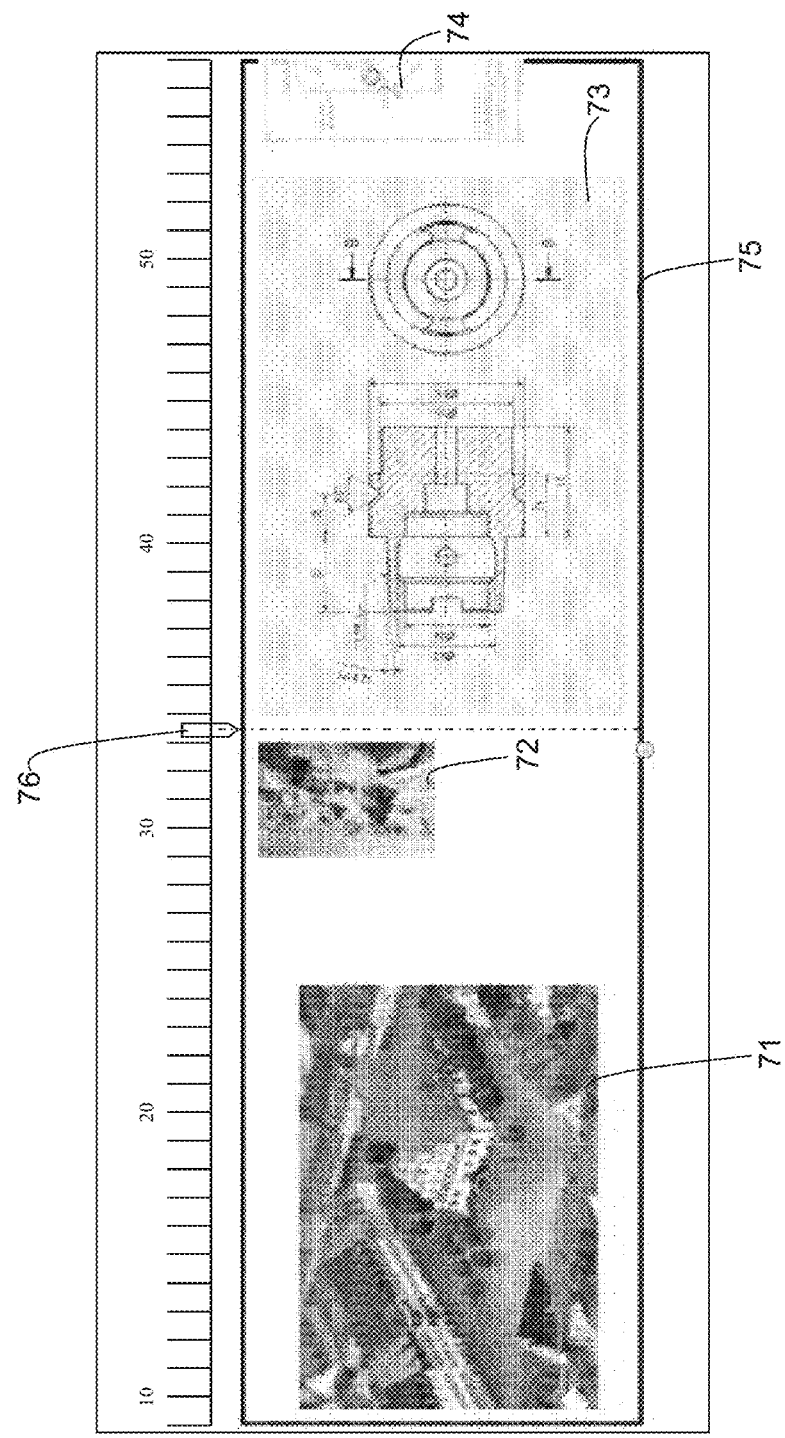

When the finishing system is a cutting system for cutting the printed roll into portions, the digital representation 75 comprises at least one finishing mark 76 and four individual digital images 71-74, for example an indication 76 of a cut line at an appropriate location on the digital representation 75 of the roll on the user interface device as shown in FIG. 7. When a piece of the roll corresponding to the location of the indication 76 of a cut line arrives at the position of the cutting system, the winding of the roll stops and the operator activates the cutting system or the cutting system automatically cuts the roll at the piece of the roll corresponding to the indication 76 of the cut line.

Figure 8:
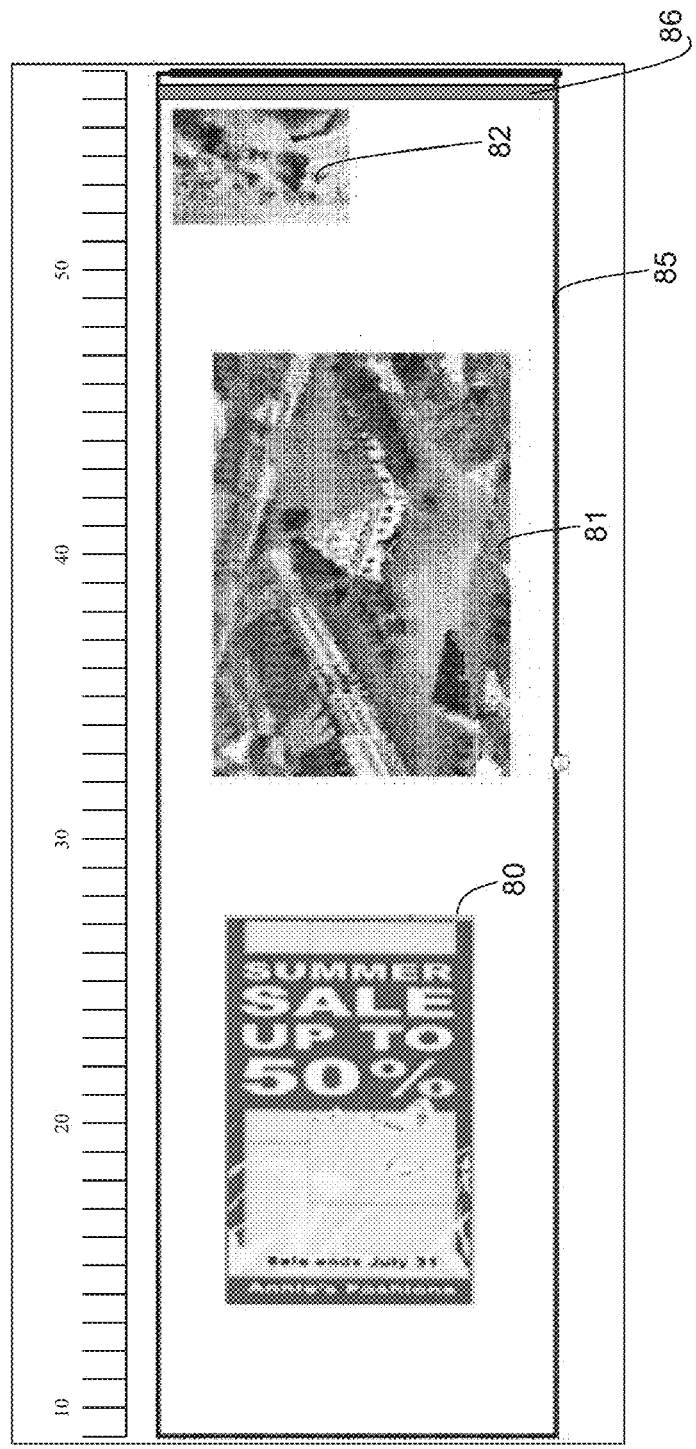
FIGS. 8, 9A and 9B schematically shows digital representations after a cutting of the roll in two portions.
Figure 9A:
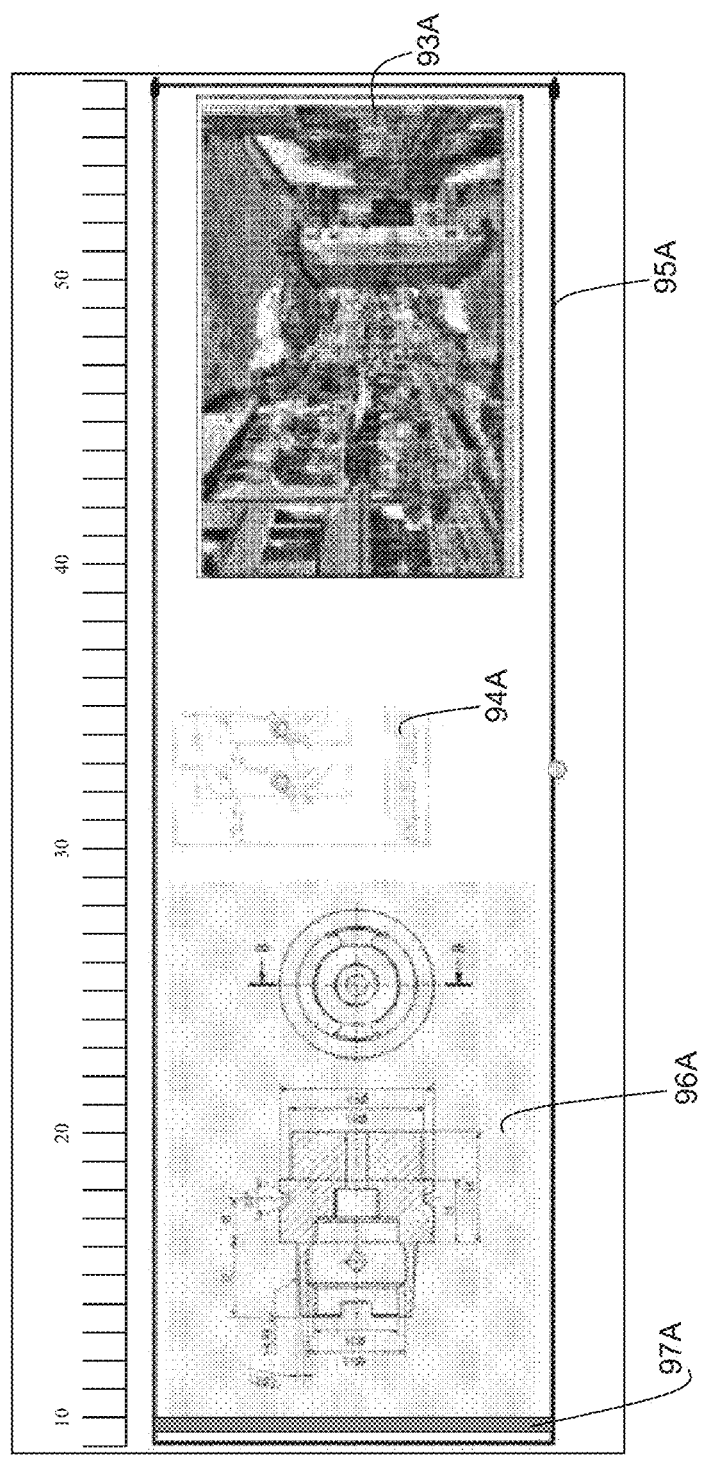

Upon cutting the printed roll into a first portion and a second portion, the digital representation 75 of the images 71-74 on the printed roll will be split into a first digital representation 85 as shown in FIG. 8 and a second digital representation 95A as shown in FIG. 9A. The first digital representation 85 represents the first portion. The first digital representation 85 comprises images 81-82 corresponding to the images 71-73 printed on the original roll and an additional image 80 also printed on the original roll but now becoming visible in the display of the first digital representation 85. An indication 86 of an end of the roll of the first portion is provided on the right side of the first digital representation 85, leaving only scrolling to the left as an initial scrolling option. The second digital representation 95A represents the second portion. The second digital representation 95A comprises images 93A-94A corresponding to the images 73-74 printed on the original roll and an additional image 96A also printed on the original roll but now becoming visible in the display of the second digital representation 95A. An indication 96A of an end of the roll of the first portion is provided on the left side of the second digital representation 95A, leaving only scrolling to the right side as an initial scrolling option. The second digital representation 95A is suitable when the second portion is left on the second winder.

The first digital representation 85 may be linked to the corresponding winder, for example via an identifier attached to the corresponding winder. The second digital representation 95A may be linked to the corresponding winder, for example via an identifier attached to the corresponding winder. The identifier may comprise a barcode, a QR code, a RFID unit, an electronic beacon, etc.

Figure 9B:
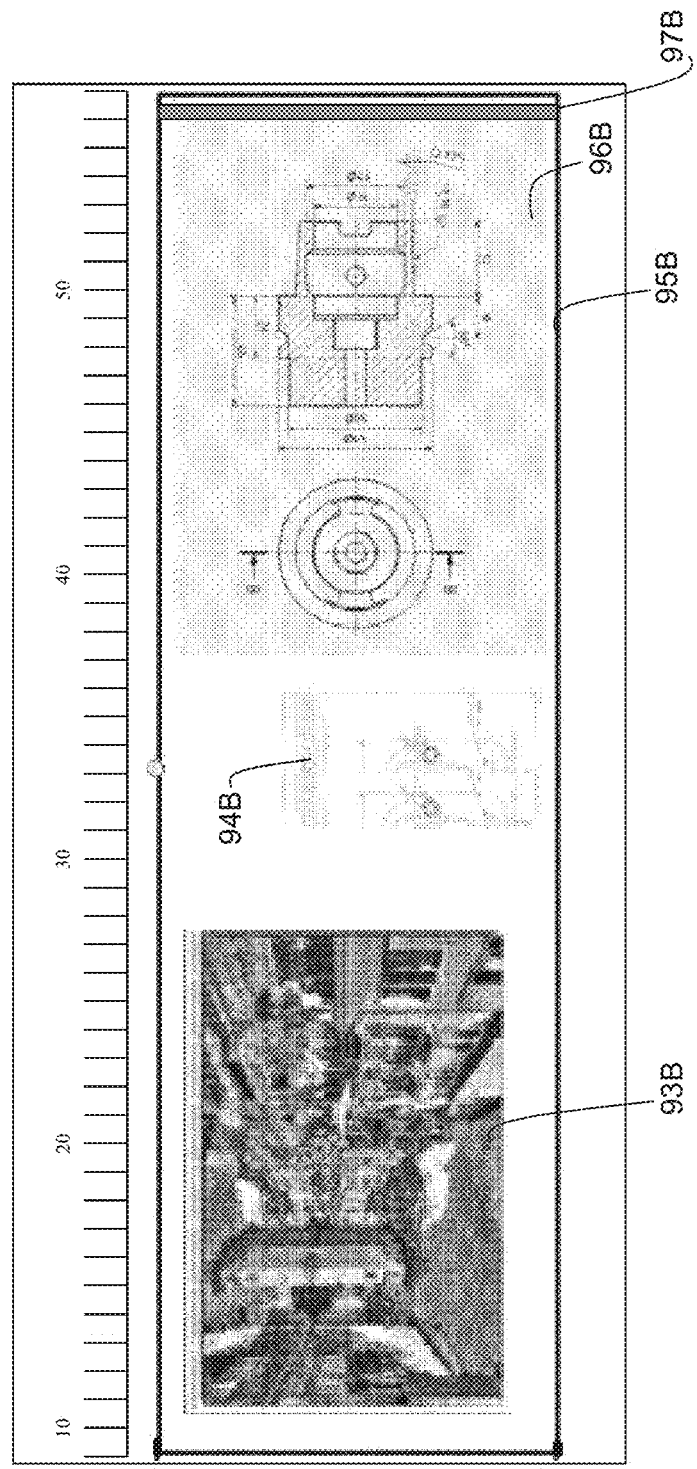

According to another embodiment, the first portion and the first winder are taken from the holder and the second portion is switched from the holder at the second winder to the holder at the first winder. In order to represent the printed images now positioned on the first winder for further operations to be conducted on the second portion of the roll, the order of the individual digital images 93B, 94B, 96B of the corresponding digital representation 95B has been turned in opposite order as shown in FIG. 9B. The end of the second portion is now indicated by an end of roll indication 97B on the right side of the digital representation leaving only scrolling to the left side as an initial scrolling option. Even each individual image 93B, 94B, 96B has been rotated over π radians.

The cutting system may comprise more than one knife. The cutting system may, for example comprise two knives for cutting a selected piece comprising at least a part of a printed image out of the roll.

Figure 10:
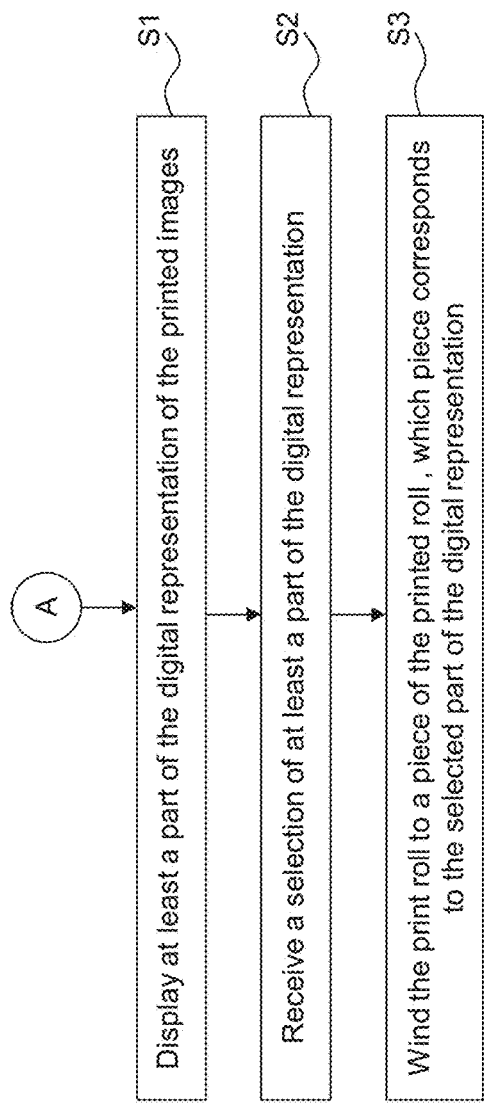
FIG. 10 is a flow diagram of the method according to the present invention.

FIG. 10 is a flow diagram of a method according to the invention. The method is started in start point A.

In a first step S1, at least a part of the digital representation of images printed on a roll is displayed on a display of the user interface device. The part may contain at least a part of one or more digital images representing images printed on the roll.

In a second step S2, a selection of a part of the digital representation is received by means of the user interface device. The selection may be achieved by clicking on the part by a mouse or by a touch in case of a touch screen. Multi-selection of images may be supported.

In a third step S3, the printed roll is winded to a piece of the printed roll, which piece corresponds to the selected part of the digital representation. An end point B of the method is reached.

According to a further embodiment of the method, the part of the digital representation is selected by scrolling to a position of the digital representation on the user interface device. This is in particular advantageous if the number of digital images of the digital representation is large. A search option for an image characteristic, like a filename, may be supported.

According to an embodiment of the method, the printed roll is wound until the piece of the printed roll is visible for operator inspection. In the unwound area, a view area is established for viewing the piece of the printed roll. The printed roll is wound—forward or backward—until the piece of the printed roll is in the view area within the unwound area.

According to an embodiment, the method comprises the further steps of receiving a command for finishing the piece of the roll with a finisher, and finishing the piece of the printed roll. The command may be received in several cases. In a first case, the digital representation comprises a finishing mark at a digital image. As soon as the printed image corresponding to the digital image comprising the finishing mark arrives at the finisher, the command may be generated. The command may be generated by control software of the scrolling system which comprises the finisher. The command is transferred to the finisher. In a second case equal to the first case, the command is also generated but only after a consent is given by the operator for finishing by means of the user interface device.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A scrolling system for scrolling a printed roll of media, comprising:
   a mechanical scrolling apparatus, and a user interface device,
   the mechanical scrolling apparatus comprising:
      a first winder configured to place the printed roll in such a manner that the printed roll is unwindable from the first winder; and
      a second winder configured to wind up the printed roll unwound from the first winder,
      wherein at least one winder of the first and second winders is drivable by a motor, and wherein the first winder and the second winder are arranged in such a manner that there is an unwound area configured to be passed by a piece of the printed roll that is unwound from the first winder and not yet wound up on the second winder, and
   wherein the user interface device is configured to receive a selection of a part of a digital representation of images printed on the roll,
   wherein, upon receiving a selection of the part of the digital representation of the images printed on the roll by means of the user interface device, the motor is configured to be activated in order to scroll the printed roll by means of the first and second winders until a piece of the printed roll arrives in the unwound area, which piece of the printed roll corresponds to the selected part of the digital representation, and
   wherein the scrolling system comprises a finishing system positioned near or in the unwound area and configured to finish said piece of the printed roll, the piece of the printed roll comprising at least one finishing mark alongside of or within the part of the digital representation, and the scrolling system is configured such that the at least one finishing mark determining an activation of the finishing system when a location on the piece of the printed roll arrives at the finishing system in the unwound area of the scrolling system, and
   wherein the finishing system is a cutting system configured to cut the printed roll into portions, and wherein the finishing system is configured such that upon cutting the printed roll into a first portion and a second portion, the digital representation of the images on the printed roll will be split into a first digital representation corresponding to printed images on the first portion and a second digital representation corresponding to printed images on the second portion.

2. The scrolling system according to claim 1, wherein the user interface device is configured to display at least a part of the digital representation of images printed on the roll in order to facilitate the selection of the part of the digital representation.

3. The scrolling system according to claim 2, wherein the user interface device is configured to receive a scrolling action for scrolling to a part of the digital representation, and scrolling to the part of the digital representation on the user interface device invokes an activation of the motor in order to scroll the printed roll by means of the first and second winders until a piece of the printed roll arrives in the unwound area, the piece of the printed roll corresponding to the part of the digital representation scrolled to.

4. The scrolling system according to claim 1, further comprising a camera system for determination of a moment of arrival of the piece of the printed roll in the unwound area.

5. The scrolling system according to claim 1, wherein the unwound area comprises a view area for viewing the piece of the printed roll, the piece of the printed roll corresponding to the selected part of the digital representation.

6. The scrolling system according to claim 1, wherein the scrolling system comprises a roll-to-roll printing system.

7. A method for unwinding a printed roll, the method comprising the steps of:
   displaying, by means of a user interface device, at least a part of a digital representation of images printed on a roll;

receiving a selection of a part of the digital representation by means of the user interface device; and automatically winding the printed roll to a piece of the printed roll, the piece of the printed roll corresponding to the selected part of the digital representation, wherein the selection comprises a finishing mark and wherein the method further comprises the steps of:

upon arrival of the piece corresponding to the selection comprising the finishing mark at a finisher, generating a command for finishing the piece of the roll by means of the finisher;

receiving the command by means of the finisher; and finishing the piece of the printed roll with the finisher, and wherein the finisher is a cutting system for cutting the printed roll into portions, and wherein, upon cutting the printed roll into a first portion and a second portion, the digital representation of the images on the printed roll will be split into a first digital representation corresponding to printed images on the first portion and a second digital representation corresponding to printed images on the second portion.

8. The method according to claim 7, wherein the part of the digital representation is selected by scrolling to a position of the digital representation on the user interface device.

9. The method according to claim 7, wherein the printed roll is wound until the piece of the printed roll is visible for operator inspection.

10. The method according to claim 7, wherein the command is generated after a consent for finishing is given by means of the user interface device.

11. A non-transitory recording medium comprising computer executable program code configured to instruct a computer to perform the method according to claim 7.

* * * * *